Patented Nov. 5, 1929

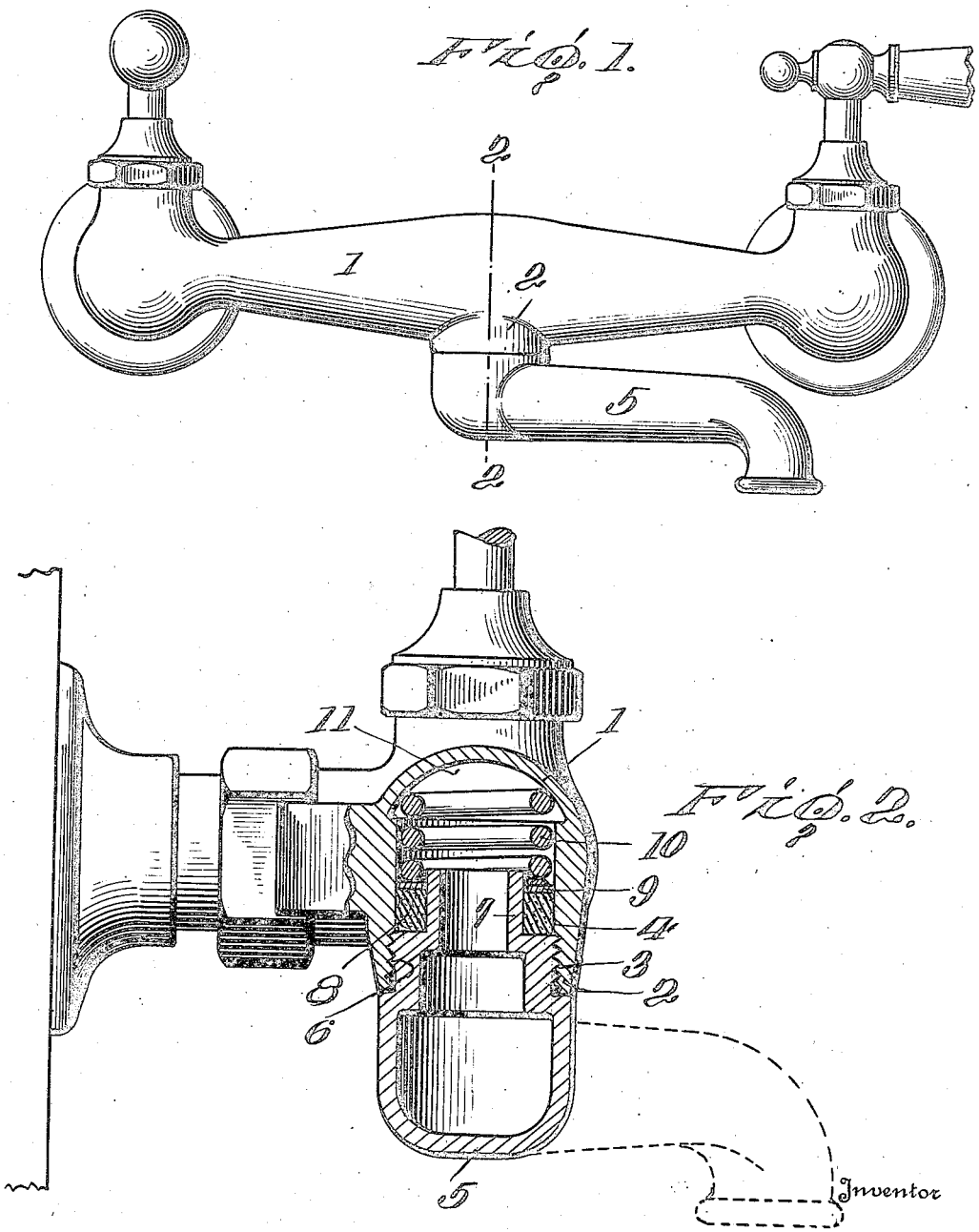

1,734,506

UNITED STATES PATENT OFFICE

ALBERT ULMAN WALTER, OF BALTIMORE, MARYLAND, ASSIGNOR TO BALTIMORE VALVE CORPORATION, OF BALTIMORE, MARYLAND, A CORPORATION OF MARYLAND

FAUCET

Application filed June 10, 1927, Serial No. 197,874. Renewed September 21, 1929.

The invention relates to new and useful improvements in a faucet, and more particularly to a faucet having a swinging nozzle.

An object of the invention is to provide a faucet of the above type wherein the swinging nozzle is connected directly to the body of the faucet without the use of a connecting collar or the like.

A further object of the invention is to provide a faucet of the above type wherein the connection between the nozzle and the body of the faucet is a threaded connection and as the nozzle swings it is threaded into and out of the body of the faucet.
A still further object of the invention is to provide a faucet of the above type having a spring which is put under compression by the connecting of the nozzle and the body of the faucet, which spring presses against the packing and holds the same tightly seated against the nozzle and body of the faucet for all swinging adjustments of the faucet.

These and other objects will in part be obvious and will in part be hereinafter more fully described.

In the drawings which show by way of illustration one embodiment of the invention:—

Figure 1 is a front view of a combination faucet embodying the improvements;

Fig. 2 is a sectional view on the line 2—2 of Figure 1.

The invention is directed broadly to a faucet which may be either a single faucet connected to a single source of supply, or a combination faucet connected to two sources or more, and has to do with the nozzle and its connection to the body of the faucet. The nozzle is directly connected to the body of the faucet and swings on its connection.

In the embodiment illustrated the connection is a threaded connection, the body portion being provided with threads which receive the threaded part on the nozzle, and when the nozzle is swung from one position to another for use it will be threaded into or out of the body to the extent of the swinging movement.

In order to provide a tight joint for such a connection a packing is used, which is of the ring type, and which is adapted to be pressed tightly against both the body of the faucet and the nozzle. This is accomplished by a coil spring which bears against an abutment on the body of faucet and against a washer which in turn rests against the packing. When the nozzle is screwed into the body of the faucet the spring is put under tension and remains under tension for all adjustments of the nozzle and thus it is that the packing will be firmly pressed and seated against the nozzle and body of the faucet for all swinging adjustments of the nozzle.

Referring more in detail to the drawings the improved faucet as shown is of the combination type and consists of a body portion 1, which is of the usual construction. This body portion has a central outlet boss 2, which is threaded internally as indicated at 3 to form a female coupling. Adjacent the threaded portion 3 the walls of the body portion of the faucet are preferably cylindrical as indicated at 4. The nozzle is indicated in the drawings at 5. The nozzle has a threaded portion 6 which is the male part of the coupling for the faucet, and this thread 6 is adapted to engage the thread 3 and the nozzle is rotated on its threaded connection until it is properly joined to the body of the faucet. The nozzle is also provided with a projecting portion 7 which is cylindrical and of much less diameter than the cylindrical portion 4 on the body of the faucet.

Located between the cylindrical portion 7 on the nozzle and the cylindrical portion 4 on the body of the faucet is a packing 8 which may be of any desired ring type construction. Preferably the packing is in the form of a split ring so that it may be made up from long sections. Bearing against the packing is a metal washer 9 which surrounds the cylindrical portion 7 on the faucet. Bearing against the washer 9 is a coil spring 10. This coil spring 10 fits loosely within the cylindrical portion 4 of the body of the faucet and seats against the body portion of the faucet at the inner surface 11 thereof.

This coil spring is wound so as to form an open spring so that in a combination faucet the fluid may pass between the coils of the spring and thus out through the spring into the nozzle. The spring is preferably of such length that the nozzle thread may be started into the female thread on the body before the spring is put under compression, but as the nozzle is turned into the body it will put the spring under compression, and it is the pressure of the spring against the washer that forces the packing against the nozzle and the body portion of the faucet thus forming a tight joint.

From the above it will be noted that I have provided a faucet wherein the nozzle may be swung so as to be set in any desired angular position relative to the body of the faucet, and the sole connection between the nozzle and the body portion of the faucet is the direct threaded connection. No separate threaded collar is necessary to join these parts. This makes a very simple construction of few parts which may be cheaply made and which is very neat and attractive.

When the nozzle is swung from one set position to another for use it will be either turned into the body of the faucet to a slight extent, or turned out of the body to a slight extent. There is no particular purpose of this movement of the nozzle into and out of the body except as to permit swinging.

In order to maintain a tight joint under the conditions just described the spring which is under compression will bear with a continuous pressure on the metallic ring against the packing regardless of the set position of the faucet, and this pressure is sufficient to maintain a tight joint.

Furthermore, this spring performs another function. Bearing as it does against the nozzle with the pressure of its expansion it will hold the nozzle from swinging too freely on its connection with the body of the faucet. While the nozzle may be easily turned from one set position to another it will stay in set position and cannot be readily thrown against the bibb or the sink if the faucet is thus associated. Furthermore, as the packing wears due to the swinging of the nozzle the spring will take up the wear and will insure that the packing is firmly seated against the nozzle and the body of the faucet and a tight joint maintained. This spring maintains a substantially constant pressure on the packing regardless of the manipulation of the nozzle and of the wear of the packing.

While I have shown my improved nozzle connection for a faucet as applied to a combined source of supply it will be obvious that it may be used in connection with a faucet for a single source of supply.

While I have shown my connection as embodied in a faucet it may also be used in the attachment of any type of swinging nozzle to a container or the like.

While I have shown the connection between the nozzle and the body as a threaded connection it will be understood that the invention in its broadest aspect is directed to the direct connection between the nozzle and the body portion of the faucet together with the spring which is placed under tension for maintaining a constant pressure on the packing.

While I have shown the threaded embodiment of the connection as consisting of an internal thread on the body of the faucet and an external thread on the nozzle, it will be understood of course that these threaded parts may be otherwise placed provided that the direct connection of the nozzle to the body of the faucet is maintained.

Having thus fully described my invention, what I claim as new and desire to secure by Letters-Patent, is:

1. The combination of a body portion, a nozzle connected to said body portion so as to swing on said body portion for use, a packing adapted to engage the nozzle and body portion, a spring adapted to compress the packing, said spring and packing being disposed between a portion of the body and a portion of the nozzle whereby when said nozzle is connected to the body the spring will be compressed to force the packing against the nozzle and body portion and maintain a tight joint for various angular positions of the nozzle and take up any wear on the packing incident to the swinging of the nozzle.

2. A faucet including in combination, a body having a discharge opening and a threaded portion, a nozzle having a threaded portion adapted to engage the threaded portion on the body and adapted to swing on said thread connection for use, a packing adapted to engage the nozzle and body, a spring adapted to compress the packing, said spring and packing being disposed between a portion of the body and a portion of the nozzle, whereby when the nozzle is threaded to the body, the spring will be compressed to force the packing against the nozzle and body and maintain a tight joint for various angular positions of the nozzle.

3. A faucet including in combination, a body having a discharge opening with an internally threaded portion, a nozzle having an externally threaded portion adapted to engage the threaded portion of the body and adapted to swing on said threaded connection for use, a packing adapted to engage the nozzle and body, a spring located within the body of the faucet and adapted to bear against the body of the faucet at one end and against the packing at its other end whereby when the nozzle is threaded into the body said spring will be compressed and force the packing against the nozzle and body and maintain a tight joint for various angular positions of the nozzle.

4. A faucet including in combination, a body having a discharge opening and a cylindrical portion adjacent said discharge opening, said discharge opening being threaded, a nozzle having a threaded portion engaging the threaded portion of the body and adapted to swing on said threaded connection for use, said nozzle having an inwardly projecting cylindrical portion with its outer wall spaced from the cylindrical wall on the body portion of the faucet, a metal washer and packing surrounding the cylindrical portion of the nozzle, said metal washer being at the inner face of said packing, a coil spring located within said cylindrical portion and seated at its inner end against the body portion of the faucet, said spring bearing against said metallic washer and forcing said packing against the nozzle and the body portion of the faucet.

In testimony whereof, I affix my signature.

ALBERT ULMAN WALTER.